(12) United States Patent
Masuda

(10) Patent No.: US 6,280,340 B1
(45) Date of Patent: Aug. 28, 2001

US006280340B1

(54) IMPACT-ABSORBABLE POWER TRANSMISSION DEVICE

(75) Inventor: Toshiyuki Masuda, Kanagawa (JP)

(73) Assignee: Unisia Jecs Corporation, Atsugi (JP)

( * ) Notice: Subject to any disclaimer, the term of this patent is extended or adjusted under 35 U.S.C. 154(b) by 0 days.

(21) Appl. No.: 09/266,610

(22) Filed: Mar. 11, 1999

(30) Foreign Application Priority Data

Mar. 12, 1998 (JP) .................................................. 10-078509

(51) Int. Cl.$^7$ ....................................................... F16C 1/26
(52) U.S. Cl. ............................ 464/179; 29/525; 464/180; 464/906; 464/140
(58) Field of Search ............................. 464/30, 141, 145, 464/906, 140, 157, 162, 180, 111; 29/525, 898.07

(56) References Cited

U.S. PATENT DOCUMENTS

| | | | |
|---|---|---|---|
| 2,698,528 | * 1/1955 | Boesch | 464/32 |
| 4,177,654 | * 12/1979 | Aucktor | 464/162 |
| 4,183,258 | 1/1980 | Stephan . | |
| 4,184,345 | 1/1980 | Cutler . | |
| 5,830,071 | * 11/1998 | Castellon | 464/162 |
| 5,916,026 | * 6/1999 | Sadakata | 464/89 |

FOREIGN PATENT DOCUMENTS

| | | |
|---|---|---|
| 19 60 550 | 5/1967 | (DE) . |
| 198 09 197 | 3/1997 | (DE) . |
| 91236 | 8/1978 | (JP) . |
| UP 4-7729 | 1/1992 | (JP) . |
| 10-258646 | * 9/1998 | (JP) . |
| 11-303846 | * 11/1999 | (JP) . |
| WO 97/07344 | 2/1997 | (WO) . |

OTHER PUBLICATIONS

Journal "Oelhydraulik und Preumatik" [Oil Hydraulics and Penumatics], 1972, No. 1, pp. I–IV.
Roloff/Matek: Maschinenelemente [Machine Elements], 6$^{th}$ Edition, 1974, Vieweg–Verlag, pp. 21, 288, 289, 294, 295.
H. Heldt: Verfahren and Hilsmittel beim Einbau und Ausbau von Walzlagern [Methods and Means for Assembling and Disassembling Roller Bearings]. In: "Die Kugellagerzeitschrift", No. 3, 1959, pp. 62–67.

\* cited by examiner

*Primary Examiner*—Anthony Knight
*Assistant Examiner*—Aaron M Dunwoody
(74) *Attorney, Agent, or Firm*—Foley & Lardner

(57) ABSTRACT

An impact-absorbable power transmission device is constituted by establishing a frictional spline connection between a shaft and a pipe to allow an axial slide therebetween and to forbid a relative rotation therebetween. An inner race of a universal joint is fixed to another end portion of the shaft by press-fitting. A flange for receiving a press-fitting force of the inner race is formed at an intermediate portion of the shaft. Therefore, the power transmission device ensures an impact absorbing performance while avoiding a lowering of a mechanical strength caused by the inner race installing operation.

3 Claims, 2 Drawing Sheets

IMPACT-ABSORBABLE POWER TRANSMISSION DEVICE

BACKGROUND OF THE INVENTION

The present invention relates to improvements in a power transmission device which is able to absorb axial impact energy and is applicable to a drive shaft and a steering column of an automotive vehicle.

A Japanese Patent Provisional Publication No. 53-91236 discloses a power transmission device arranged to connect a shaft and a pipe by means of a spline coupling so as to allow a relative slide in the axial direction therebetween and to forbid a relative rotation therebetween. Further, a shear pin is installed in a through-hole of the shaft and a through-hole of the pipe to connect the shaft and the pipe so as to restrict the axial movement therebetween. If the power transmission device receives an axial impact applied to the shaft and the pipe, the axial impact energy is absorbed by the axial movement between the shaft and the pipe while absorbing the energy by means of the friction caused by the spline coupling and of a breakage of the shear pin. In case that a universal joint is fixedly installed to an end portion of the shaft by means of a press-fitting, it is necessary to apply a press-fitting force to the shaft and the pipe. If such an installation of the universal joint is simply carried out, the shaft will slide with respect to the pipe through the spline coupling. Therefore, in case of such a conventional power transmission device with a universal joint, it is necessary that the universal joint is installed to the shaft by fixedly supporting an intermediate portion of the shaft by means of a chucking device in order to receive the press-fitting force of the universal joint.

SUMMARY OF THE INVENTION

However, there is a possibility that such chucking of the shaft will injure a peripheral surface of the shaft so as to lower the mechanical strength of the shaft.

It is an object of the present invention to provide an improved power transmission device which is produced to have an impact absorbing property while maintaining the mechanical strength of a shaft.

An impact-absorbable power transmission device according to the present invention comprises a shaft, a pipe, a spline coupling connecting the shaft and the pipe, and a universal joint connected to the shaft. The spline coupling connects the shaft and the pipe so as to allow an axial movement with a frictional force therebetween and to forbid a relative rotation therebetween. The universal joint is fixed with an end portion of the shaft by means of press-fitting. The shaft has a flange at which a force for press-fitting the universal joint is received.

DETAILED DESCRIPTION OF THE INVENTION

Figure 1:
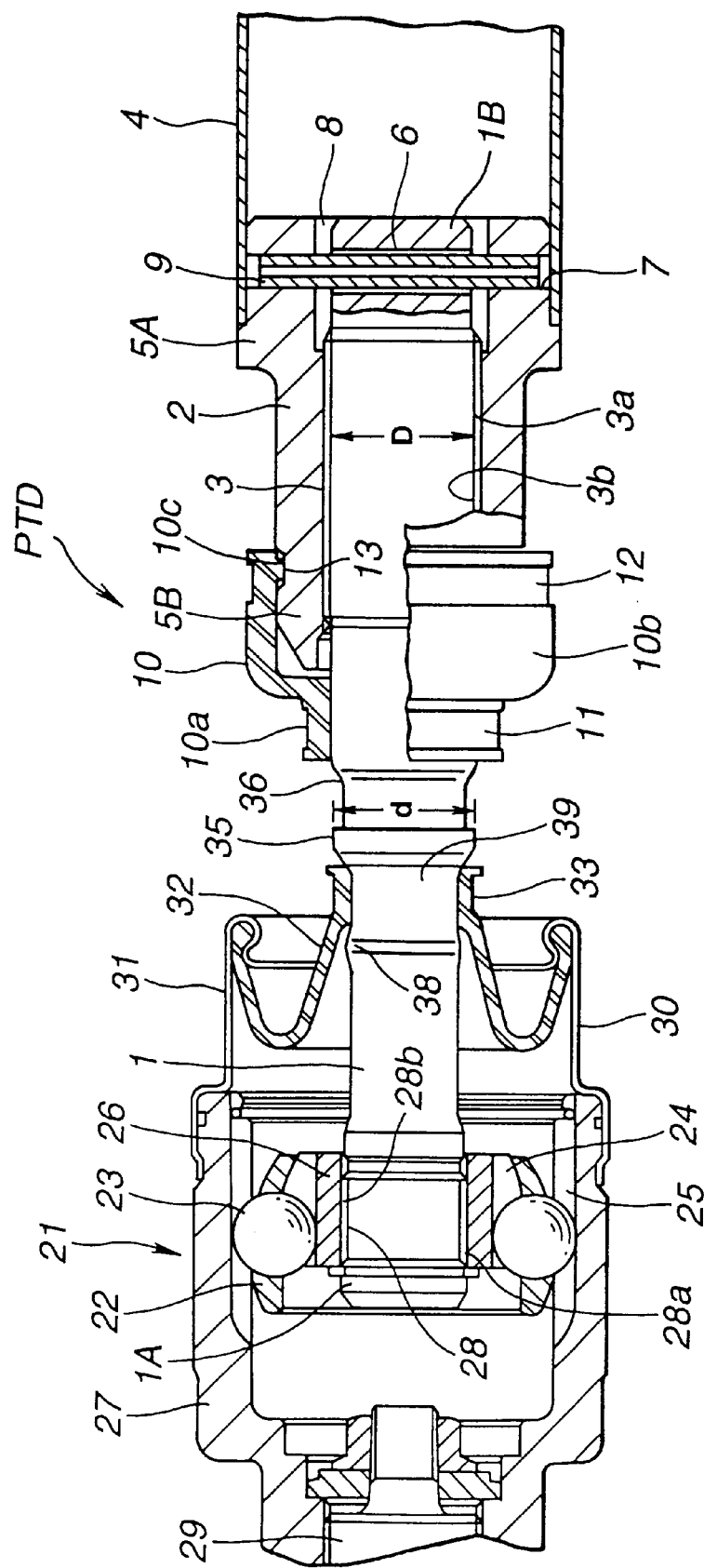
FIG. 1 is a cross-sectional view of an essential part of a power transmission device of an embodiment according to the present invention.
Figure 2:
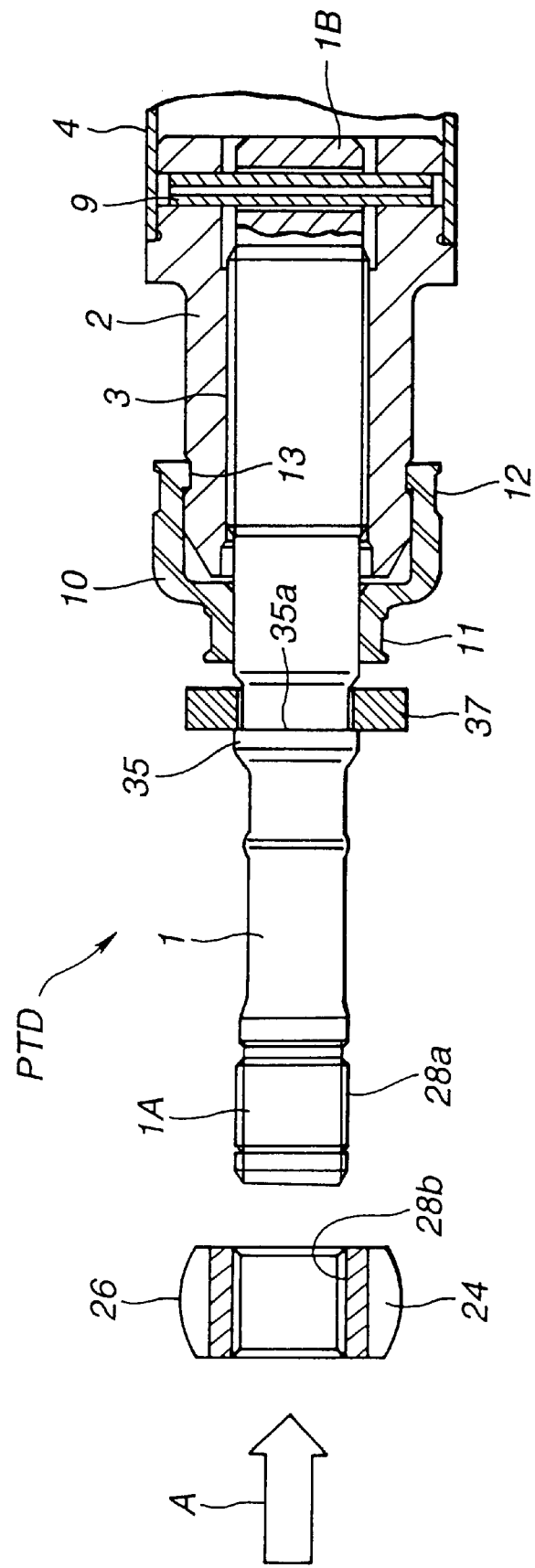
FIG. 2 is a cross-sectional view showing an assembly process of an inner race to an input shaft of FIG. 1.

Referring to FIGS. 1 and 2, there is shown an embodiment of a power transmission device PTD according to the present invention.

As shown in FIG. 1, the power transmission device PTD according to the present invention comprises a shaft 1 and a pipe 2 connected to the shaft 1. The shaft 1 and the pipe 2 are connected through a splined coupling 3 functioning as a sliding joint so that they are slidable in the axial direction therebetween and fixed in the rotation direction therebetween. That is, a shaft spline (parallel keys around the shaft 1) 3a is formed at an end portion of the shaft 1, and a keyed female component 3b is formed at an inner surface of the pipe 2. The shaft spline 3a of the shaft 1 is engaged with the female component 3b of the pipe 2 so as to generate a predetermined press-fitting load (slide resistance).

A tube 4 made of metal or fiber reinforced synthetic resin is installed at an end portion 5A of the pipe 2. More specifically, as shown in FIG. 1, the tube 4 is installed at the right end portion 5A of the pipe 2. The right end portion 5A is formed such that its outer diameter at the end portion 5A having a predetermined length is smaller than that of a continuous portion to the end portion 5A of the pipe 2 by the amount of a thickness of the tube 4. An end portion of the tube 4 is press-fitted to an outer portion of the end portion 5A and connected therewith by means of welding or adhesion.

A through-hole 6 is formed at an end portion 1B of the shaft 1, which portion is inserted in the pipe 2. A through-hole 7 is formed at the end portion 5A of the pipe 2. As shown in FIG. 1, these through-holes 6 and 7 are formed at a right side of the shaft 1 and the pipe 2 and diametrically penetrate them. A diameter of the through-hole 6 of the shaft 1 is formed greater than that of the through-hoe 7 of the pipe 2. When the tube 4 is press-fitted to the pipe 2, openings of the through-hole 7 of the pipe 2 is covered with the tube 4. These through-holes 6 and 7 are formed by means of drilling.

An outer diameter of the end portion 1B of the shaft 1 is formed smaller than a diameter of the female component 3b of the pipe 2. An inner diameter at the end portion 5A of the pipe 2 is formed larger than a diameter of the shaft spline 3a of the shaft 1. Therefore, a predetermined annular clearance is formed between an outer surface of the end portion 1B of the shaft 1 and the inner surface of the end portion 5A of the pipe 2. As is clear from FIG. 1, the through-holes 6 and 7 are formed at the portions having the annular clearance between the shaft 1 and the pipe 2.

A shear pin 9 is inserted in the through-holes 6 and 7 to connect the through-holes 6 and 7. Since the diameter of the through-hole 6 of the shaft 1 is formed greater than that of the through-hole 7 of the pipe 2, the shear pin 9 is inserted to the through-holes 6 and 7 so as to have a predetermined clearance with respect to the through-hole 6 and no clearance with respect to the through-hole 7. The shear pin 9 is arranged to be broken when a force greater than a predetermined value is axially applied to the shaft 1 and the pipe 2. Following to the breakage of the shear pin 9, the relative slide between the shaft 1 and the pipe 2 is caused. Therefore, the impact force applied to the shaft 1 and the pipe 2 is absorbed by the breakage of the shear pin 9 and the relative slide between the shaft 1 and the pipe 2. According to the required strength of the power transmission device PTD with respect to the axial force, material and section modulus of the shear pin 9 is determined.

In order to seal the spline coupling 3, a boot made of rubber or synthetic resin is provided. The boot 10 is formed into a stepped cylinder having a small diameter portion 10a and a large diameter portion 10b. The small diameter portion 10a is fitted on an outer surface of the shaft 1 and fixed by a clamp 11. The large diameter portion 10b is fitted on an outer surface of a left end portion 5B of the pipe 2 and fixed by a clamp 12. This installation of the boot 10 enables the spline coupling 3 between the shaft 1 and the pipe 2 to be sealed and prevents water or mud from invading into the spline coupling 3. Further, an inner projection 10c is formed at an inner periphery of an end portion of the large diameter portion 10b of the boot 10. The inner projection 10c is engaged with an annular groove 13 formed at an outer periphery of the pipe 2 so as to reinforce the installation of the boot 10.

A ball-splined universal joint 21 comprises a plurality of balls 23, a gage 22 arranging the balls 23 on an imaginary plane, an inner race 26 including ball grooves 24 extending in the axial direction and an outer race 27 including ball grooves 25 extending in the axial direction. The balls 23 are arranged to be rotatable in the ball grooves 24 and 25. The inner race 26 is fixed with the end portion 1A of the shaft 1 by means of the press fitting. More specifically, a shaft spline 28a is formed on the end portion 1A of the shaft 1, and a female component 28b is formed on an inner surface of the inner race 26. The shaft spline 28a and the female component 28b are fixedly engaged with each other by the press fitting to constitute a fixed spline coupling 28.

An end portion of the outer race 27 is formed to decrease its diameter and is connected to an input shaft 29, as shown in FIG. 1. A seal device 30 is arranged to seal the universal joint 21. The seal device 30 comprises a cylindrical boot adapter 31 made of metal, a boot 32 made of rubber or synthetic resin. An end portion of the boot adapter 31 is installed to the outer race 27 of the universal joint 31. The other end portion of the boot adapter 31 sealingly clamps an end portion of the boot 32. The other end portion of the boot 32 is fitted with an annular groove 39 of the shaft 1 and is fixed by a clamp 33.

A flange 35 is formed at an intermediate portion of the shaft 1 so as to be able to receive a press fitting force of the inner race 26 to the shaft 1. The flange 35 is annularly and outwardly projected by forming an annular groove 36 on the shaft 1. The flange 35 includes a supporting surface 35a perpendicular to an axis of the shaft 1. A diameter d of the flange 35 is formed to be smaller than an inner diameter D of the spline coupling 3. An annular projection 38 is formed at a near portion of the flange 35 on the shaft 1 and defines the annular groove 39 with the flange 35. Therefore, the other end portion of the boot 32 is fittingly connected with the annular groove 39 so as to restrict the axial movement of the boot 32 on the shaft 1 and therefore improve the sealing performance of the boot 32.

Next, the manner of installation of the inner race 26 of the universal joint 21 to the end portion 1A of the shaft 1 will be discussed with reference to FIG. 2.

A supporting device 37 constituted by a plurality of divided parts is disposed around an outer surface of the annular groove 36 of the shaft 1. Next, the supporting device 37 is contacted with the supporting surface 35a of the flange 35. The inner race 26 is then press-fitted to the end portion 1A of the shaft 1 in the direction of an arrow A in FIG. 2. By this press-fitting, the female component 28b of the inner race 26 is fixedly engaged with the shaft spline 28a so as to establish the fixed spline coupling 28 between the shaft 1 and the inner race 26. During this installation process, the press-fitting force of the inner race 26 is received by the supporting device 37 through the supporting surface 35a of the flange 35. Therefore, the installation of the inner race 26 to the shaft 1 is accomplished without injuring a surface of the shaft 1. Thereafter, the balls 23 set in the gage 22 and the outer race 27 are installed to the inner race 26 to assemble the universal joint 21 at the end portion 1A of the shaft 1.

The power transmission device PTD with the universal joint 21 is used to connect the shaft 1 with a power drive system (not shown) through the universal joint 21 and the input shaft 29 and by connecting the pipe 2 with a driven system (not shown) through the tube 4. Therefore, a rotational drive force inputted from the input shaft 29 through the universal joint 21 to the shaft 1 is transmitted to the pipe 2 and the tube 4 through the spline coupling 3. Further, the drive force is transmitted from the tube 4 to the driven system. During this power transmission of the power transmission device PTD, a slight force axially applied to the shaft 1 and the pipe 2 is received by the press-fitting load (frictional resistance) of the spline coupling 3 and a shearing strength of the shear pin 9.

On the other hand, in case that a force (impact force) greater than the predetermined value is axially applied to the shaft 1 and the pipe 2, the impact energy of the impact force is consumed by the breakage of the shear pin 9 and the relative slide between the shaft 1 and the pipe 2. Even during this breakage of the shear pin 9 under an operating condition of the power transmission device PTD, that is, even when the power transmission device PTD according to the present invention is rotated in high speed and causes the breakage of the shear pin 9 by receiving the axial impact, the broken shear pin 9 is not thrown out from the through-holes 6 and 7. The reason for this is that the openings of the through-hole 7 of the pipe 2 are covered with the tube 4. Further, since this covering by the tube 4 functions to prevent water or mud from invading into the through-holes 6 and 7, the shear pin 9 is protected from being rusted and corroded. This functions to maintain the aimed impact absorbing ability of the power transmission device PTD.

Since the press-fitting load of the inner race 26 is received by the supporting device 37 which is in contact with the supporting surface 35a of the flange 35, the outer surface of the shaft 1 does not be insured by this press-fitting operation. Therefore, according to the present invention, it is possible to provide an impact-absorbable power transmission device having a stable mechanical strength invited by no defect on the surface of the shaft 1.

Further, the power transmission device PTD according to the present invention is arranged such that the diameter d of the flange 35 is smaller than the inner diameter D of the spline coupling 3. Therefore, when a relatively large impact force is axially applied to the power transmission device PTD, the flange 35 is easily slid in the female component 3b of the pipe 2 after the shaft 1 is axially slid to the pipe 2 while receiving the frictional resistance of the spline coupling 3. This ensures the axial movement of the shaft 1 through the spline coupling 3 and enables the spline coupling 3 to smoothly execute the impact absorption function against the axial impact applied to the power transmission device PTD.

Additionally, the through-holes 6 and 7 of the shaft 1 and the pipe 2 are formed at portions axially apart from the spline coupling 3. With the arrangement of the through-holes 6 and 7, when the shear pin 9 is broken and the relative movement between the shaft 1 and the pipe 2 is axially generated by receiving an impact force greater than the predetermined value to the shaft 1 and the pipe 2, the broken shear pin 9 never prevents the axial operation of the spline coupling 3. More specifically, in case that the power transmission device PTD according to the present invention is arranged as shown in FIG. 1, the broken pieces of the shear pin 9 is rapidly discharged through the annular clearance 8 between the shaft 1 and the pipe 2. This ensures the stable impact absorbing function of the power transmission device PTD according to the present invention.

Since the shear pin 9 is installed to penetrate the through-holes 6 and 7 while having a predetermined clearance to the through-hole 6 of the shaft 1, when the drive force is transmitted from the shaft 1 to the pipe 2 through the spline coupling 3, the shear pin 9 does not receive a shearing force caused by the transmission force to be transmitted from the input shaft 29 to the driven system through the power transmission device PTD.

Although the invention has been described above by reference to a certain embodiment of the invention, the invention is not limited to the embodiments described above. Modifications and variations of the embodiments described above will occur to those skilled in the art, in light of the above teaching. For example, although the embodiment of the present invention has described the universal joint 21 of a ball-spline type, it will be understood that it is not limited to this embodiment and may employ various types of universal joint.

The entire contents of Japanese Patent Application No. 10-78509 filed on Mar. 12, 1998 in Japan are incorporated herein by reference.

What is claimed is:

1. An impact-absorbable power transmission device comprising:
   a shaft;
   a pipe;
   a spline coupling connecting said shaft and said pipe so as to allow an axial movement with a frictional force therebetween and to forbid a relative rotation therebetween;
   a universal joint fixed with an end portion of said shaft by press-fitting;
   a flange at which a force for press-fitting said universal joint to the end portion of said shaft is received;
   a shear pin installed in a through-hole formed at the end portion of said shaft and a through-hole formed at an end portion of said pipe; and
   a tube connected to the end portion of said pipe so as to cover openings of the through-hole of said pipe.

2. An impact-absorbable power transmission device comprising:
   a shaft having a first end portion, a second end portion and an intermediate portion, a first shaft spline being formed between the first end portion and the intermediate portion, the first end portion being formed so that its diameter is smaller than a diameter of the shaft spline, a second shaft spline being formed at the second end portion, a flange being formed at the intermediate portion and having an inner-race installation-force receiving portion, a first through-hole being formed at the first end portion;
   a pipe having a first end portion and an intermediate portion and a second end portion, a female spline being formed at an inner surface of the intermediate portion of said pipe, a second through-hole being formed at the first end portion, the female spline being frictionally splined with the first shaft spline of said shaft so as to allow an axial movement with a frictional force therebetween and to forbid a relative rotation therebetween; and
   a universal joint having an inner race which has a female spline at its inner surface, the inner race being fixed to the second end portion of said shaft by means of press-fitting;
   wherein the inner-race installation-force receiving portion is supported by an external supporting device when the inner race is press-fitted to the second end portion of said shaft.

3. An impact-absorbable power transmission device as claimed in claim 2, further comprising a shear pin installed in the first and second through-holes.

* * * * *